United States Patent Office 2,823,909
Patented Feb. 18, 1958

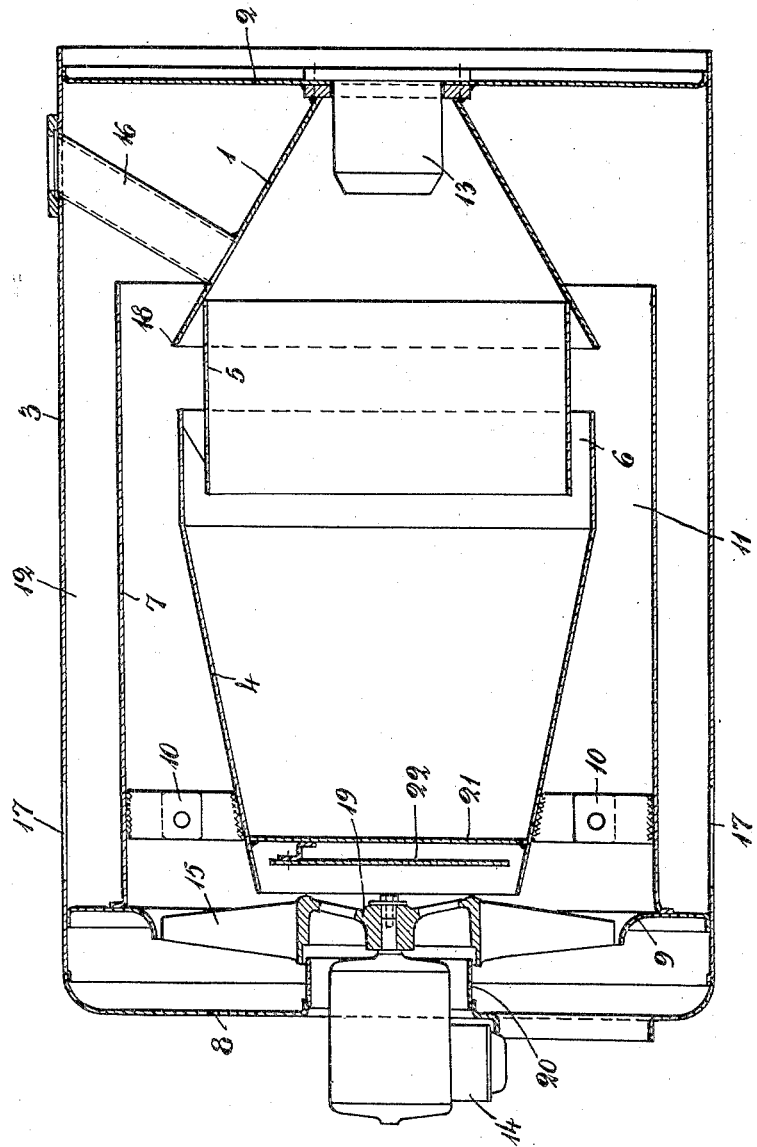

2,823,909
OIL-FIRED HEAT GENERATORS

John Evert Sterling, Enkoping, Sweden, assignor to Aktiebolaget Bahco, Stockholm, Sweden, a corporation of Sweden Application March 11, 1955, Serial No. 493,770

Claims priority, application Sweden March 31, 1954

3 Claims. (Cl. 263—19)

The present invention relates to oil-fired heat generators, particularly intended for drying purposes, which emit a mixture of combustion gases and heated air and comprise a combustion chamber, a mixing chamber for mixing the combustion gases and the air and a fan for moving the gas mixture. The object of this invention is to provide an apparatus which is simple and inexpensive in manufacture and in which the desired admixture of the combustion gases and the air will be as complete as possible. In accordance with this invention this object is attained by means of a heat generator of the above type in which the combustion chamber which is substantially circular in cross-section, is centrally located within a surrounding cylindrical casing so that the casing and the outer wall of the combustion chamber define an annular mixing chamber, and in which the fan is so disposed at one end of the mixing chamber that it draws in fresh air through the opposite end of the mixing chamber, which communicates with the atmosphere, and simultaneously draws combustion gases from the combustion chamber into the mixing chamber, which communicates with the combustion chamber through a preferably annular passage which is so constructed that the combustion gases enter said mixing chamber in counter-current to the flow of fresh air whereby admixture will take place in an annular turbulent mixing zone which ensures the desired admixture.

In a suitable embodiment of the invention a sharp edge projects into the mixing chamber from the combustion chamber and, as seen in the direction of flow of the air, ahead of the gas entrance passage, said edge generating a back-flow whirl which further increases the turbulence and thus the intensity of mixing between the two media.

The invention will be further described with reference to the drawing which shows in longitudinal cross-section an embodiment of the invention.

In the embodiment shown on the drawing, the combustion chamber consists of three parts, a front conical part 1 secured to an end wall 2 of a cylindrical housing 3, a rear conical part 4 and an intermediate cylindrical part 5 of such a diameter and length that it extends partly into the front part 1 and the rear part 4, the cylindrical part 5 is secured to the conical part 1 around its peripheral edge while the opposite end of the cylindrical part 5 is spaced from the part 4 so that the parts 4 and 5 define an annular clearance. Within the housing 3 and surrounding the combustion chamber there is provided a cylindrical casing 7 secured to a partition 9 which is arranged adjacent to but spaced from the opposite end-wall 8 of the housing 3. The cylindrical casing 7 supports the conical part 4 of the combustion chamber by means of a number of radial supporting rods 10. As seen from the drawing, the diameters of the housing 3, the casing 7 and the parts 1, 4, 5 are such that an annular passage 11 is formed between the parts 1, 4, 5 and the casing 7 and a second annular passage 12 between the casing 7 and the housing 3. The last-mentioned passage 12 communicates with the outer air through openings 17 in the housing 3 and communicates with the passage 11 at the end adjacent the end-wall 2. The oil burner pipe (not shown) is adapted to enter the combustion chamber through the tubular member 13 provided in the end-wall 2. At the opposite end-wall 8 of the housing 3 there is disposed a fan driven by an electric motor 14. The rotor 15 of the fan is mounted in an opening formed in the partition 9. 16 is a pipe for control of the flame provided with a control glass.

From the above description as well as the drawing it will be appreciated that in operation, the fan 14, 15 will draw combustion gases from the combustion chamber through the clearance 6 into the passage 11 which serves as a mixing chamber and simultaneously fresh air through the apertures 17 and the passage 12 into the mixing chamber 11. Since the combustion gases and the fresh air enter the mixing chamber 11 in counter-current a highly efficient mixing action will be produced. The back-flow whirl, caused by the edge 18 of the part 1 projecting into the mixing chamber will enhance the turbulence generated in that region of the mixing chamber 11 where the combustion gases and the fresh air meet, whereby the mixing action will be further improved.

As seen from the drawing, the hub 19 of the fan rotor has a number of openings and coacts with a sleeve 20 surrounding the motor 14 in such a manner that the fan will also draw a flow of air through the sleeve 20 and the fan hub 19, which flow of air is admixed with the combustion gas-air mixture. Thereby, the electric motor 14 and its driving shaft are subjected to a certain cooling action which prevents overheating of the motor due to heat transfer from the fan blades to the motor shaft and to the heat radiating from the combustion chamber. This heat radiation towards the motor 14 has further been reduced by a screening partition 22 positioned outside the end-wall 21 of the combustion chamber.

Of course the invention is not limited to the invention shown and disclosed above, but may be varied in many ways within the scope of the invention.

Having now particularly described the nature of my invention and the manner of the operation what I claim is:

1. A liquid fuel burning heat generator for generating a mixture of combustion gases and air, said generator comprising an elongated outer casing of substantially circular cross-section, an elongated inner casing of substantially circular cross-section including a combustion chamber and disposed coaxially within the outer casing, said casings defining an annular space therebetween, said space constituting a mixing chamber, one end of the mixing chamber communicating with the atmosphere to form an inlet for fresh air, suction means communicating with the other end of the mixing chamber for drawing an air current through the said chamber in one direction and conduit means connecting the combustion chamber with the mixing chamber and issuing into the latter chamber in a direction substantially opposite to that of the air current for drawing combustion gas into the mixing chamber by the suction of said air current, the air current and the gas current entering the mixing chamber in counter current whereby a turbulent mixing zone is formed causing an intimate mixture of air and gas, said inner casing comprising a cylindrical intermediate portion and an inwardly tapered portion posterior of the cylindrical portion as seen in the direction of the air flow, said tapered portion having a cylindrical extension overlapping the respective end of the intermediate portion and being radially spaced therefrom to form said gas conduit means.

2. A heat generator according to claim 1, wherein said inner casing comprises a second inwardly tapered portion on the opposite side of said cylindrical portion, said second portion being circumferentially extended beyond the respective edge of the intermediate portion to form a circular edge obstructing the path of flow opposite the outlet of the gas conduit means for increasing the turbulence in the mixing zone and thus the intimacy of the air-gas mixture.

3. A liquid fuel burning heat generator for generating a mixture of combustion gases and air, said generator comprising an elongated outer casing of substantially circular cross-section, an elongated inner casing of substantially circular cross-section including a combustion chamber and disposed coaxially within the outer casing, said casings defining an annular space therebetween, said space constituting a mixing chamber, one end of the mixing chamber communicating with the atmosphere to form an inlet for fresh air, suction means communicating with the other end of the mixing chamber for drawing an air current through the said chamber in one direction and conduit means connecting the combustion chamber with the mixing chamber and issuing into the latter chamber in a direction substantially opposite to that of the air current for drawing combustion gas into the mixing chamber by the suction of said air current, the air current and the gas current entering the mixing chamber in counter current whereby a turbulent mixing zone is formed causing an intimate mixture of air and gas, said suction means comprising a suction fan disposed coaxially with said casing, the end of the inner casing juxtaposed said fan including an aperture and the portion of the fan blades facing said aperture having openings therethrough for drawing a secondary flow of gas and air through the fan blades thereby cooling the fan.

References Cited in the file of this patent

UNITED STATES PATENTS

| | | |
|---|---|---|
| 1,863,391 | Bluemel | June 14, 1932 |
| 2,390,578 | Findley | Dec. 11, 1945 |
| 2,517,398 | McCollum | Aug. 1, 1950 |